(12) United States Patent
Rekowski

(10) Patent No.: US 8,426,768 B2
(45) Date of Patent: Apr. 23, 2013

(54) POSITION-BASED LASER TRIGGERING FOR SCANNER

(75) Inventor: Ronald Rekowski, Pittsburgh, PA (US)

(73) Assignee: Aerotech, Inc., Pittsburgh, PA (US)

( * ) Notice: Subject to any disclaimer, the term of this patent is extended or adjusted under 35 U.S.C. 154(b) by 1464 days.

(21) Appl. No.: 12/034,175

(22) Filed: Feb. 20, 2008

(65) Prior Publication Data

US 2009/0206066 A1 Aug. 20, 2009

(51) Int. Cl.
*B23K 26/08* (2006.01)
*B23K 26/20* (2006.01)
*G02B 26/10* (2006.01)

(52) U.S. Cl.
USPC ............ 219/121.81; 219/121.63; 219/121.74; 359/202.1

(58) Field of Classification Search ............ 219/121.62, 219/121.63, 121.64, 121.74, 121.81; 359/201.2, 359/202.1, 223.1
See application file for complete search history.

(56) References Cited

U.S. PATENT DOCUMENTS

| | | | | |
|---|---|---|---|---|
| 4,003,626 A | * | 1/1977 | Reinke et al. | 359/202.1 |
| 4,532,402 A | * | 7/1985 | Overbeck | 219/121.74 |
| 4,714,830 A | * | 12/1987 | Usui | 359/202.1 |
| 4,791,591 A | * | 12/1988 | Asanuma et al. | 359/201.1 |
| 4,941,082 A | | 7/1990 | Pailthorp et al. | |
| 5,690,846 A | * | 11/1997 | Okada et al. | 219/121.78 |
| 5,751,585 A | * | 5/1998 | Cutler et al. | 700/161 |
| 6,674,045 B2 | | 1/2004 | Iwase et al. | |
| 6,706,999 B1 | | 3/2004 | Barrett et al. | |
| 6,886,284 B2 | | 5/2005 | Lizotte | |
| 2002/0125222 A1 | * | 9/2002 | Iwase et al. | 219/121.81 |
| 2005/0128553 A1 | * | 6/2005 | Toyama et al. | 219/121.74 |
| 2006/0132801 A1 | * | 6/2006 | Yonescu | 356/602 |
| 2006/0144827 A1 | | 7/2006 | Papenfuss et al. | |
| 2006/0215246 A1 | * | 9/2006 | Kerekes et al. | 359/201 |
| 2007/0227773 A1 | * | 10/2007 | Ono et al. | 175/24 |
| 2008/0223837 A1 | * | 9/2008 | Bruland et al. | 219/121.78 |

FOREIGN PATENT DOCUMENTS

| | | | |
|---|---|---|---|
| JP | 2002-361449 A | * | 12/2002 |
| JP | 2004-174539 A | * | 6/2004 |
| JP | 2004-177502 A | * | 6/2004 |
| JP | 2007-283345 A | * | 11/2007 |

OTHER PUBLICATIONS

Machine translation of Japan Patent document No. 2002-361,449, Aug. 2012.*
Machine translation of Japan Patent document No. 2004-174,539, Aug. 2012.*
Machine translation of Japan Patent document No. 2004-177,502, Aug. 2012.*
Machine translation of Japan Patent document No. 2007-283,345, 2012.*

* cited by examiner

*Primary Examiner* — Geoffrey S Evans
(74) *Attorney, Agent, or Firm* — The Webb Law Firm

(57) ABSTRACT

A method of directing a laser beam along a desired path on a workpiece and at spaced intervals delivering a pulse of laser energy comprising the steps of: using a position command stream and position feedback to control the positioning of galvanometer scanned mirror or mirrors to define the path a laser beam will travel to intersect the desired path on the workpiece; and using position feedback alone to determine when a pulse of laser energy is delivered to strike the workpiece at locations such that are uniformly overlapped along the path notwithstanding variations in galvanometer mirror velocity.

15 Claims, 2 Drawing Sheets

POSITION-BASED LASER TRIGGERING FOR SCANNER

BACKGROUND OF THE INVENTION

1. Field of the Invention

This invention relates to precision laser welding, marking or cutting. Pulses of laser energy are triggered on the change in position of the galvo scanner used to direct the laser energy to the workpiece or change in position of the galvo and the workpiece.

2. Description of Related Art

Apparatus for accurately positioning a laser beam on a workpiece surface for various purposes are known in the art. For example, Overbeck U.S. Pat. No. 4,532,402 entitled "Method and Apparatus for Positioning a Focused Beam on an Integrated Circuit" discloses an X-Y positioning table for moving the workpiece into the field of view of a galvanometer beam positioning system. The galvanometer (typically referred to as a "galvo") comprises two mirrors mounted for rotation. The mirrors are separately controlled by drive assembles including scanning motors for directing a laser beam over the workpiece. Control of the mirrors is coordinated with the movement of the X-Y positioning table supporting the workpiece. Interferometer position feedback from the X-Y positioning table is passed to the galvanometer drive assembles making it unnecessary to move the X-Y positioning table over the workpiece and await settling of the table at the stopped position.

Precision laser welding wherein the overlapped weld beads are applied along a weld seam is used in various applications, for example, in production of implantable medical devices. Where a hermetically sealed weld seam is required, overlapping weld beads are laid down along the weld seam as disclosed, for example, in Papenfuss et al. U.S. Application Publication No. 2006/0144827 entitled "Method and Apparatus for Laser Welding Incorporating Galvanometer Delivery." This published patent application teaches that the laser is pulsed at a fixed frequency, say 10 Hertz, while the galvanometer directs the beam along the weld path. This represents the current state of the art known to applicant. The laser pulses are timed by a constant frequency clock that is asynchronous to the motion of the scanner mirrors and/or an X-Y positioning table supporting the workpiece. The frequency of the laser pulses is based on the laser spot size, desired spot overlap, and the programmed full speed in one direction of the scan over the workpiece. This approach results in varying spot overlap at the beginning and end of programmed motion because the speed varies during the acceleration and deceleration of the galvanometer mirrors. One attempt to overcome the problem is to change the frequency of the laser pulses along the beam path. This reduces but does not eliminate the overlap variation. This procedure can introduce variability in pulse placement as the ideal point at which to modify the pulse frequency does not coincide with the change in speed of the scan over the workpiece.

SUMMARY OF THE INVENTION

Briefly, according to this invention, there is provided a method of laser welding, marking or cutting. According to one embodiment of this invention, there is provided a method of laser welding, marking or cutting by directing a laser beam along a desired path on a workpiece and at spaced intervals delivering a pulse of laser energy. The method comprises a first step of using a position command stream and position feedback to control the positioning of a galvanometer scanned mirror or mirrors to define the path a laser beam will travel to intersect the desired path on the workpiece. A second step comprises using position feedback, without reference to the command stream, to determine when a pulse of laser energy is delivered to form a weld bead on the workpiece such that the laser pulses strike the workpiece at locations that are uniformly overlapped along the path notwithstanding variations in galvanometer mirror velocity.

A galvanometer positioning system, according to one embodiment of this invention, uses the position command stream and the mirror X-position and the mirror Y-position feedback to control the positioning of a galvanometer mirror or mirrors to define the path a laser beam will travel to intersect the desired path on the workpiece. According to this embodiment, mirror X-position feedback and mirror Y-position feedback signals are continuously squared and summed and the sum or the change in the sum is compared to a target value to determine when the next pulse of laser energy is delivered. In the case of welding, the weld beads are thus uniformly overlapped along the weld path notwithstanding variations in galvanometer mirror velocity.

According to another embodiment, a method comprises a first step of using a position command stream and mirror position feedback to control the positioning of a galvanometer scanned mirror or mirrors and stage position feedback to control the positioning of a stage on which the workpiece is fixed. The movements of the galvanometer and the stage together cause the laser beam to intersect the desired path on the workpiece. In a second step, mirror and stage position feedbacks are used to determine when a pulse of laser energy is delivered to the workpiece such that the laser pulses strike the workpiece at locations that are uniformly overlapped along the weld path notwithstanding variations in galvanometer mirror velocity and/or stage velocity.

A galvanometer positioning system, according to another embodiment of this invention, uses a position command stream and mirror X-position and mirror Y-position feedback to control the positioning of a galvanometer mirror or mirrors. The command stream and the stage X-position and the stage Y-position feedback control the positioning of a stage or stages on which the workpiece is fixed. The mirror X-position feedback and the stage X-position feedback are continuously summed and squared, and the mirror Y-position feedback and stage Y-position feedback are continuously summed and squared. The squares are then summed and the sum or change in sum is compared to a target value to determine when the next pulse of laser energy is delivered. In the case of welding, the weld beads are thus uniformly overlapped along the weld path notwithstanding variations in galvanometer mirror velocity and/or stage velocity.

According to a preferred practice, the mirror X-position and mirror Y-position feedback are mapped with a two-dimensional error correction function to avoid the pincushion effect. Also, the mirror feedback and stage feedback are preferably scaled so as to match resolutions. In a particular embodiment, the stage X-position and stage Y-position feedback are scaled to match the resolution of the stage feedback to the resolution of the galvanometer feedback.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Generally, the present invention is directed to a system and method for triggering a pulsed laser based on the substantially uniform vector displacement along a path on a workpiece, for example, the weld path, caused by rotation of the scanner mirrors. More specifically, the present invention is a system and method that triggers a laser pulse for application to a workpiece based on the real-time monitored vector displacement caused by a pair of scanner mirrors that operate to scan the pulsed laser beam in the direction of respective X and Y axes.

Figure 1:
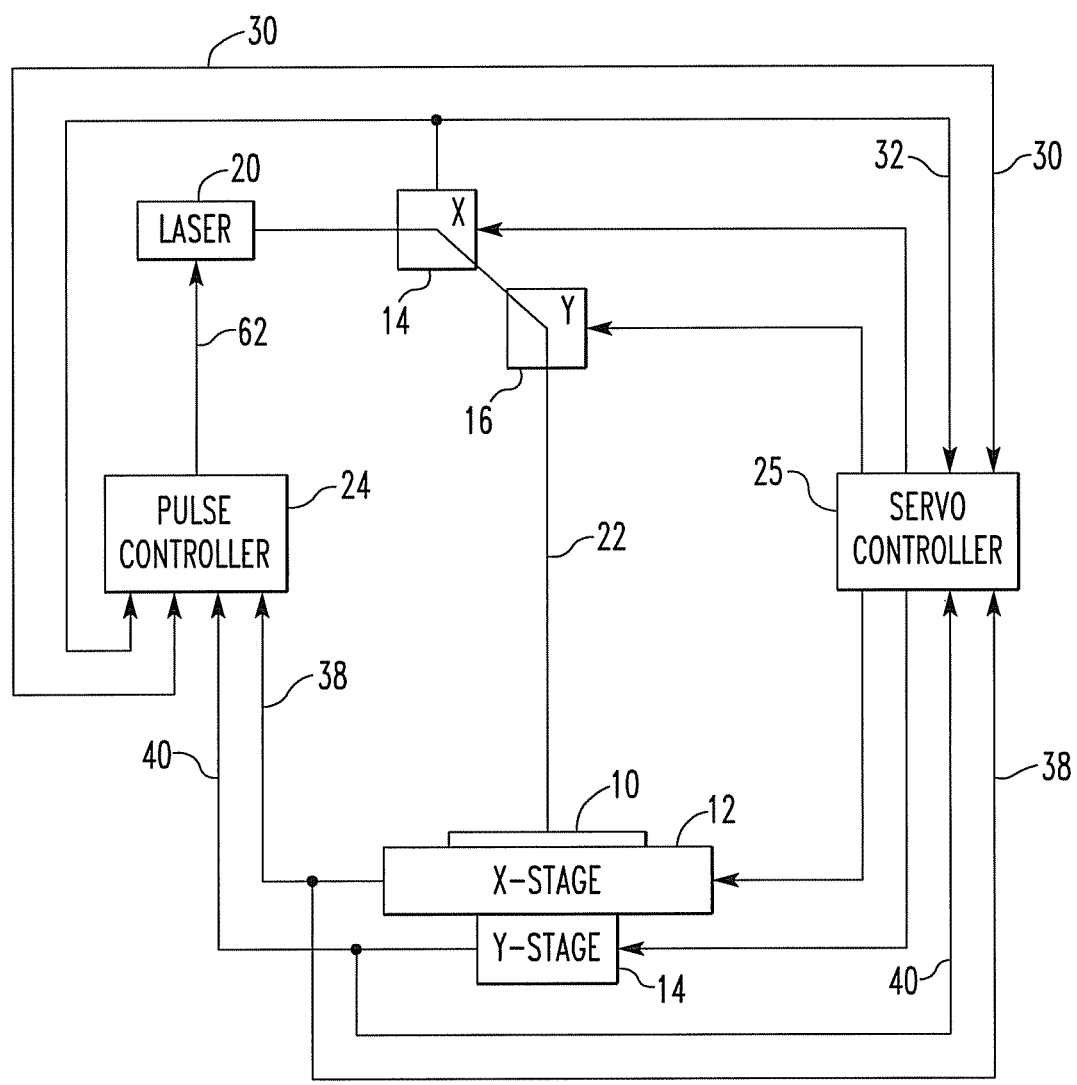
FIG. 1 schematically illustrates the arrangement of apparatus for practice of one embodiment of this invention.

Referring to FIG. 1, the workpiece 10 to be welded is mounted on an X-stage 12 which, in turn, is mounted on a Y-stage 14. Each stage is controlled by a servo controller 25 and, for example, a linear motor (not shown). The servo controller 25 compares a commanded position from a command stream to position feedback signals usually generated by encoders, for example, optical encoders, associated with the motors that move the stages to place the workpiece in a position generally below an X-galvo 16 and a Y-galvo 18. Each galvo is controlled by the servo controller 25 which compares a commanded position from the command stream with position feedback signals generated by encoders, for example, optical encoders, usually associated with the rotating motors associated with the galvos. It should be understood that other devices for generating position feedback may be used in place of optical encoders. The servo controller 25 compares the command stream with feedback signals from the galvos to position the mirrors. A pulsed laser beam 22 is deflected by a mirror associated with the X-galvo to a mirror associated with the Y-galvo to the weld path on the workpiece 10. It should be understood that the X-galvo and the Y-galvo can be combined into an X-Y galvo having a single mirror that can rotate about two perpendicular axes.

Pulse controller 24 processes X and Y galvo (mirror position) feedback and X and Y stage feedback signals to determine when to trigger the laser pulses as will be explained further with reference to FIG. 2

Real-time mirror positions in the respective X and Y axes are input along with error correction functions that correct mirror positions due to optical distortion. Positions of respective X and Y axis stages that control movement of the workpiece are scaled into units consistent with mirror displacement and then added to the corrected mirror displacement calculation. The total displacement along the weld path in the respective X and Y directions is then squared. These squared displacements are then added together. When the added squared displacements along the respective X and Y axes reach or surpass a target displacement, the pulsed laser is triggered and the laser beam is applied to the workpiece.

Displacement of the beam on the workpiece is calculated based upon the displacement of the scanner mirrors. Error mapping functions may be utilized to modify the command positions of the scanner mirrors to correct for optical distortion of the marking field ("pincushion effect") while monitoring the real-time displacement of the scanner mirrors. Additionally, motion of the workpiece along the X and Y axes of the X- and Y-stages is accounted for by monitoring feedback from such motion. A scale factor is applied to the feedback devices to match the resolution of the feedback devices with the resolution of the scanner. Of course, the inverse scale factor could be applied to the mirror position feedback.

Figure 2:
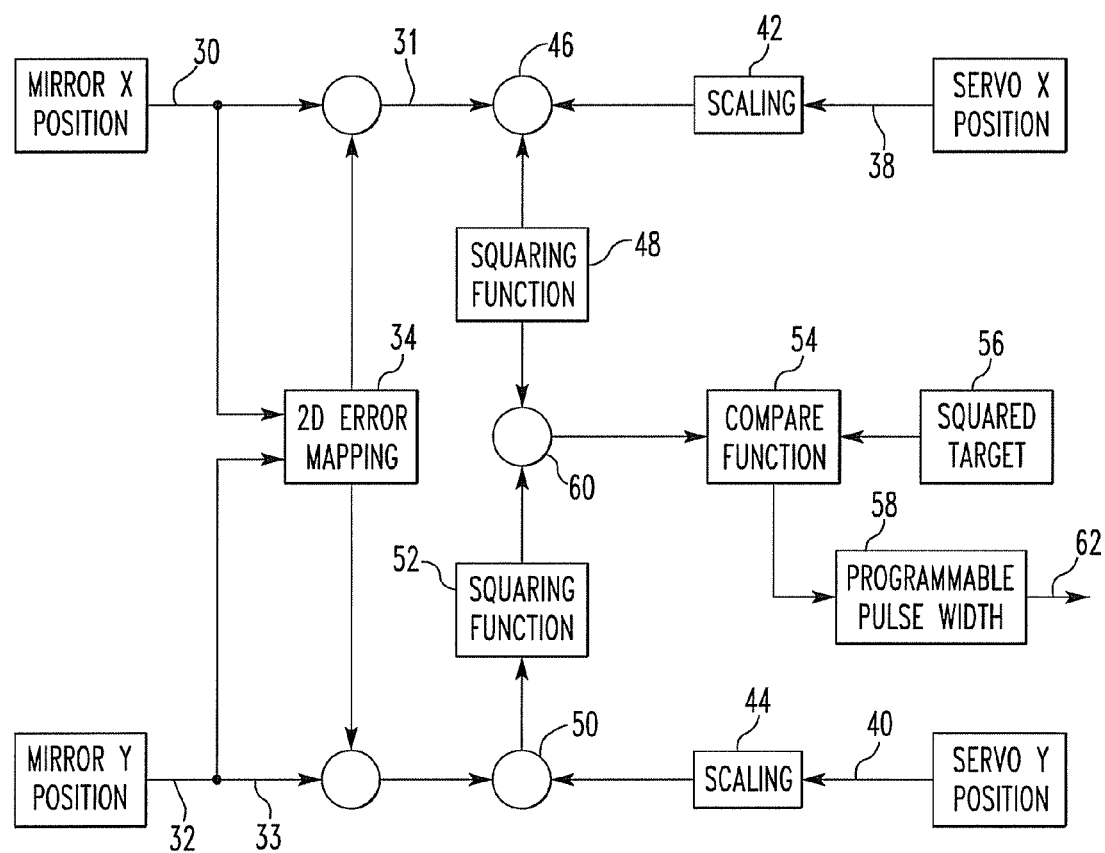
FIG. 2 is a diagram illustrating the flow and processing of signals in one embodiment of the systems and methods according to this invention.

Referring now to FIG. 2, a laser triggering function is implemented in a programmable logic device such as a field programmable gate array (FPGA). The mirror X-position and the mirror Y-position feedback signals 30, 32 are fed to error mapping function 34 to compensate for the pincushion effect. It should be understood that the mirror X-position or mirror Y-position feedback signals are indicative of the rotation of the mirror or mirrors that cause the reflected laser beam to move in the X-direction or the Y-direction respectively. According to the present invention, the mirror feedback signals are preferably corrected for the pincushion effect. See, for example, U.S. Pat. No. 4,941,082 entitled "Light Beam Positioning System" for error mapping functions applied to position command signals for overcoming the pincushion effect. The pincushion compensated signals 31 and 33 are passed to adders 46 and 59, respectively. The stage X-position and Y-position feedback signals 38, 40 are fed to scaling functions 42, 44. The two X-position signals are added at 46 and squared at 48. The two Y-position signals are added at 50 and squared at 52. The squared signals are added at 60 and then compared at 54 to a squared target signal supplied from 56 and upon a match trigger a laser pulse 62 which may have a programmable width at 58.

Having thus defined my invention in the detail and particularity required by the Patent Laws, what is desired protected by Letters Patent is set forth in the following claims.

The invention claimed is:

1. A method of directing a laser beam along a desired path on a workpiece and at spaced intervals delivering a pulse of laser energy comprising the steps of:

using a position command stream commanding a desired position where the laser beam would intersect the workpiece and mirror X-position and mirror Y-position feedback indicative of the actual targeted position on the workpiece to control the positioning of galvanometer scanned mirror or mirrors to define the path a laser beam will travel to intersect the desired path on the workpiece; and continuously summing the squares of mirror X-position feedback and the mirror Y-position feedback and comparing to a target value to trigger when the next pulse of laser energy is delivered to a location on the workpiece such that the locations are uniformly overlapped along the path and, recovering a workpiece modified by pulses of overlapped laser energy.

2. A method according to claim 1, wherein the mirror X-position feedback and mirror Y-position feedback are mapped to eliminate the pincushion effect.

3. A method of directing a laser beam along a desired weld path on a workpiece and at spaced intervals delivering a pulse of laser energy comprising the steps of:

using a position command stream commanding a desired position where the laser beam would intersect the workpiece and mirror X-position and mirror Y-position feedback indicative of the actual targeted position on the workpiece to control the positioning of a galvanometer scanned mirror or mirrors and stage X-position and Y-position feedback to control the positioning of stage or stages on which the workpiece is fixed which galvanometer(s) and stage(s) together cause the laser beam to intersect the desired path on the workpiece; and continuously summing the mirror X-position feedback and stage X-position feedback and squaring the sum, and continuously summing the mirror Y-position feedback and stage Y-position feedback and squaring the sum, summing the squares and comparing the sum or change in sum to a target value to trigger when the next pulse of laser energy is delivered to a location on the workpiece such that the locations are uniformly overlapped along the path and, recovering a workpiece modified by pulses of overlapped laser energy.

4. A method according to claim 3, wherein the mirror X-position and mirror Y-position feedback are mapped to avoid the pincushion effect.

5. A method according to claim 4, wherein the stage position feedback or mirror position feedback is scaled to match the resolutions of the feedbacks.

6. A laser directing system comprising a triggerable laser, galvanometer positioner with associated mirror or mirrors, rotary motors, and encoders generating mirror X-position and mirror Y-position feedback signals, a servo controller for directing a laser beam along a desired path on a workpiece using a position command stream commanding a desired position where the laser beam would intersect the workpiece and mirror position feedback signals indicative of the actual targeted position on the workpiece to control the positioning of galvanometer mirror or mirrors to define the path a laser beam will travel to intersect the desired path on a workpiece; and a pulse controller using mirror position X-position and mirror Y-position feedback signals alone to trigger when a pulse of laser energy is delivered to a location on the workpiece such that the locations are uniformly overlapped along the path, wherein the pulse controller comprises means for continuously squaring the mirror X-position feedback signal and the mirror Y-position feedback signal, summing the squares and comparing the summed squares to a target value to trigger when the next pulse of laser energy is delivered to a location on the workpiece such that the locations are uniformly overlapped along the path.

7. The system according to claim 6, further comprising means for mapping the mirror X-position feedback signal and mirror Y-position feedback signal to eliminate the pincushion effect.

8. A laser directing system comprising a triggerable laser, a galvanometer positioner with associated mirror or mirrors, rotary motors, and encoders generating mirror X-position and mirror Y-position feedback signals, workpiece stage or stages with associated linear motors, and encoders generating stage X-position and stage Y-position feedback signal, comprising:

a servo controller comprising means for directing a laser beam along a desired path on a workpiece using a position command stream commanding a desired position where the laser beam would intersect the workpiece and position feedback indicative of the actual targeted position on the workpiece to control the positioning of galvanometer mirror or mirrors and stages to define the path a laser beam will travel to intersect the desired path on the workpiece; and a pulse controller using mirror and stage position feedback alone to trigger when a pulse of laser energy is delivered to a location on the workpiece such that the locations are uniformly overlapped along the path, wherein the pulse controller comprises means for continuously summing the mirror X-position feedback and the stage X-position feedback and squaring the sum, and continuously summing the mirror Y-position feedback and stage Y-position feedback and squaring the sum, summing the squares and comparing the sum or change in sum to a target value to trigger when the next pulse of laser energy is delivered to form a weld bead on the workpiece such that weld beads are uniformly overlapped along the weld path.

9. The system according to claim 8, wherein the mirror X-position and mirror Y-position feedback are mapped to avoid the pincushion effect.

10. The system according to claim 8, wherein the stage position feedback or mirror position feedback is scaled to match the resolutions of the feedbacks.

11. A laser welding system comprising a triggerable laser, galvanometer positioner with associated mirror or mirrors, rotary motors, and encoders generating mirror X-position and mirror Y-position feedback signals;

a servo controller for directing a laser beam along a desired weld path on a workpiece using a position command stream commanding a desired position where the laser beam would intersect the workpiece and mirror position feedback signals indicative of the actual targeted position on the workpiece to control the positioning of galvanometer mirror or mirrors to define the path a laser beam will travel to intersect the desired weld path on a workpiece; and a pulse controller using mirror position X-position and mirror Y-position feedback signals alone to trigger when a pulse of laser energy is delivered to form a weld bead on the workpiece such that weld beads are uniformly overlapped along the weld path, wherein the pulse controller comprises means for continuously squaring the mirror X-position feedback signal and the mirror Y-position feedback signal, summing the squares and comparing the summed squares to a target value to trigger when the next pulse of laser energy is delivered to form a weld bead on the workpiece such that weld beads are uniformly overlapped along the weld path.

12. The laser welding system according to claim 11, further comprising means for mapping the mirror X-position feedback signal and mirror Y-position feedback signal to eliminate the pincushion effect.

13. A laser welding system comprising a triggerable laser, a galvanometer positioner with associated mirror or mirrors, rotary motors, and encoders generating mirror X-position and mirror Y-position feedback signals, workpiece stage or stages with associated linear motors, and encoders generating stage X-position and stage Y-position feedback signal, comprising:

a servo controller comprising means for directing a laser beam along a desired weld path on a workpiece using a position command stream commanding a desired position where the laser beam would intersect the workpiece and position feedback indicative of the actual targeted position on the workpiece to control the positioning of galvanometer mirror or mirrors and stages to define the path a laser beam will travel to intersect the desired weld path on the workpiece; and a pulse controller using mirror and stage position feedback alone to trigger when a pulse of laser energy is delivered to form a weld bead on the workpiece such that weld beads are uniformly overlapped along the weld path, wherein the pulse controller comprises means for continuously summing the mirror X-position feedback and the stage X-position feedback and squaring the sum, and continuously summing the mirror Y-position feedback and stage Y-position feedback and squaring the sum, summing the squares and comparing the sum or change in sum to a target value to trigger when the next pulse of laser energy is delivered to form a weld bead on the workpiece such that weld beads are uniformly overlapped along the weld path.

14. The laser welding system according to claim 13, wherein the mirror X-position and mirror Y-position feedback are mapped to avoid the pincushion effect.

15. The laser welding system according to claim 14, wherein the stage position feedback or mirror position feedback is scaled to match the resolutions of the feedbacks.

* * * * *